United States Patent [19]

Bohley

[11] Patent Number: 5,287,133
[45] Date of Patent: Feb. 15, 1994

[54] SELF-ORIENTING PIPE INSPECTION APPARATUS AND METHOD

[75] Inventor: David C. Bohley, Vermilion, Ohio

[73] Assignee: Bohley's Diving Service, Inc., Vermillion, Ohio

[21] Appl. No.: 799,314

[22] Filed: Nov. 27, 1991

[51] Int. Cl.⁵ .................. G03B 37/00; G03B 17/08
[52] U.S. Cl. ...................... 354/63; 354/64; 346/33 P; 348/84
[58] Field of Search .......... 354/63, 64; 346/33 P; 358/100, 99, 106

[56] References Cited

U.S. PATENT DOCUMENTS

| | | | |
|---|---|---|---|
| 2,909,975 | 10/1959 | Ulrich | 354/63 |
| 3,621,767 | 11/1971 | Hyzer et al. | 354/63 |
| 3,667,359 | 6/1972 | Watts et al. | 354/63 |
| 3,754,275 | 8/1973 | Carter et al. | 346/33 P X |
| 3,761,623 | 9/1973 | Hara et al. | 358/100 |
| 3,827,068 | 7/1974 | Hill, Jr. et al. | 354/63 |
| 3,832,724 | 8/1974 | Duval | 354/63 |
| 4,107,738 | 8/1978 | Van Norman | 358/100 |
| 4,249,810 | 2/1981 | O'Conner et al. | 354/63 |
| 4,363,545 | 12/1982 | Schaefer et al. | 354/63 |
| 4,372,658 | 2/1983 | O'Connor et al. | 354/63 |
| 4,434,427 | 2/1984 | Clarke et al. | 346/33 P |
| 4,560,931 | 12/1985 | Murakami et al. | 346/33 P X |
| 4,607,925 | 8/1986 | Kamigaichi et al. | 354/63 |
| 4,654,702 | 3/1987 | Tolino et al. | 358/100 |
| 4,722,001 | 1/1988 | Röhrich et al. | 358/100 |
| 4,913,558 | 4/1990 | Weltervik et al. | 354/63 X |
| 4,985,763 | 1/1991 | Fraser | 358/100 |
| 5,084,764 | 1/1992 | Day | 358/100 |
| 5,089,895 | 2/1992 | Fraker et al. | 358/100 XR |

Primary Examiner—Michael L. Gellner
Assistant Examiner—J. K. Han
Attorney, Agent, or Firm—Watts, Hoffmann, Fisher & Heinke

[57] ABSTRACT

A device for photographing the interior of pipelines is disclosed. The device deposited at the pipeline's inlet and is drawn through the pipeline by fluid flow. The combination of a ballast device and a floatation device and a rudder maintain the device in proper orientation. The device is untethered and is powered by a battery carried in the vessel. A control circuit permits a time delay before operating the camera and lights.

14 Claims, 4 Drawing Sheets

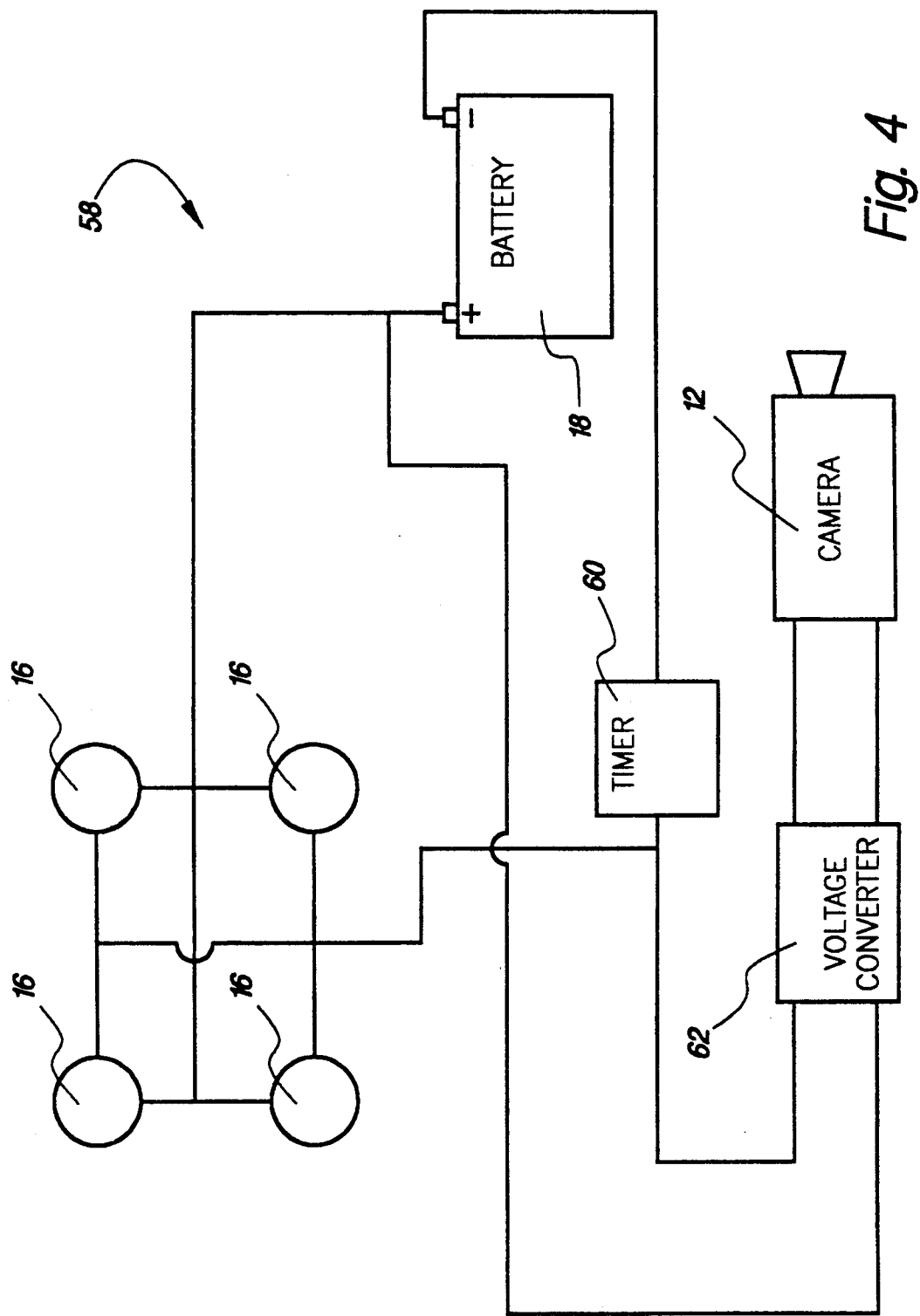

SELF-ORIENTING PIPE INSPECTION APPARATUS AND METHOD

BACKGROUND OF THE INVENTION

1. Field of the Invention

This invention relates to apparatuses for photographing pipeline interiors, and more particularly, self-navigated apparatuses for recording images of pipeline interiors.

2. Description of Related Art

Municipalities and utilities often have very long underwater pipelines to maintain. Often, there are blockages created by debris, and particularly in the Great Lakes, accumulations of mussels on the pipeline interior walls. To determine what measures are necessary to maintain the pipeline, it is necessary to see the pipeline interior. In some cases, a diver may swim into the pipeline carrying a camera. This is a very dangerous operation and there are very few divers who will attempt it. In many cases, pipelines are too long for a diver to swim.

Some efforts have been made to develop robotic devices for photographing pipeline interiors. Typically, these devices are tethered to a winch or are motor-driven. The tethered devices are limited by the length of the tether, the longest of which is about two miles. Some pipelines are several miles in length which is too long for conventional tethered devices. Motor-driven divices are limited by their battery life. These devices use power-consuming motors, complex control systems, numerous parts, and are costly. Thus, there is a great need for a simple, inexpensive device for photographing pipeline interiors which is capable of operating over long distances.

SUMMARY OF THE INVENTION

Basically, the invention comprises a device for transporting a camera through pipelines containing flowing fluid. The device includes a structure for connecting the camera to the device and a buoyant structure for providing a buoyant force on the device. A leg is provided for contacting the pipeline. Lights are provided for illuminating the pipeline interior and a battery is provided for powering the lights and the camera. Fluid flowing inside the pipeline conveys the device and acts on the device to aim the camera.

In use, the device is deposited adjacent to or inside a pipeline entrance. A pump for drawing fluid through the pipeline is operated such that the device is conveyed through the pipeline by the moving fluid at a speed which is slower than that of the fluid. The camera and the lights are operated while the device is being conveyed. The device is retrieved at a downstream location.

Advantageously, the operation of the camera and the lights may be delayed by a predetermined time by a control circuit.

BRIEF DESCRIPTION OF THE DRAWINGS

A preferred embodiment of the invention is shown in the accompanying drawings in which:

FIG. 4 is a schematic diagram showing the operating circuit of the device.

DETAILED DESCRIPTION OF THE PREFERRED EMBODIMENT

Figure 1:
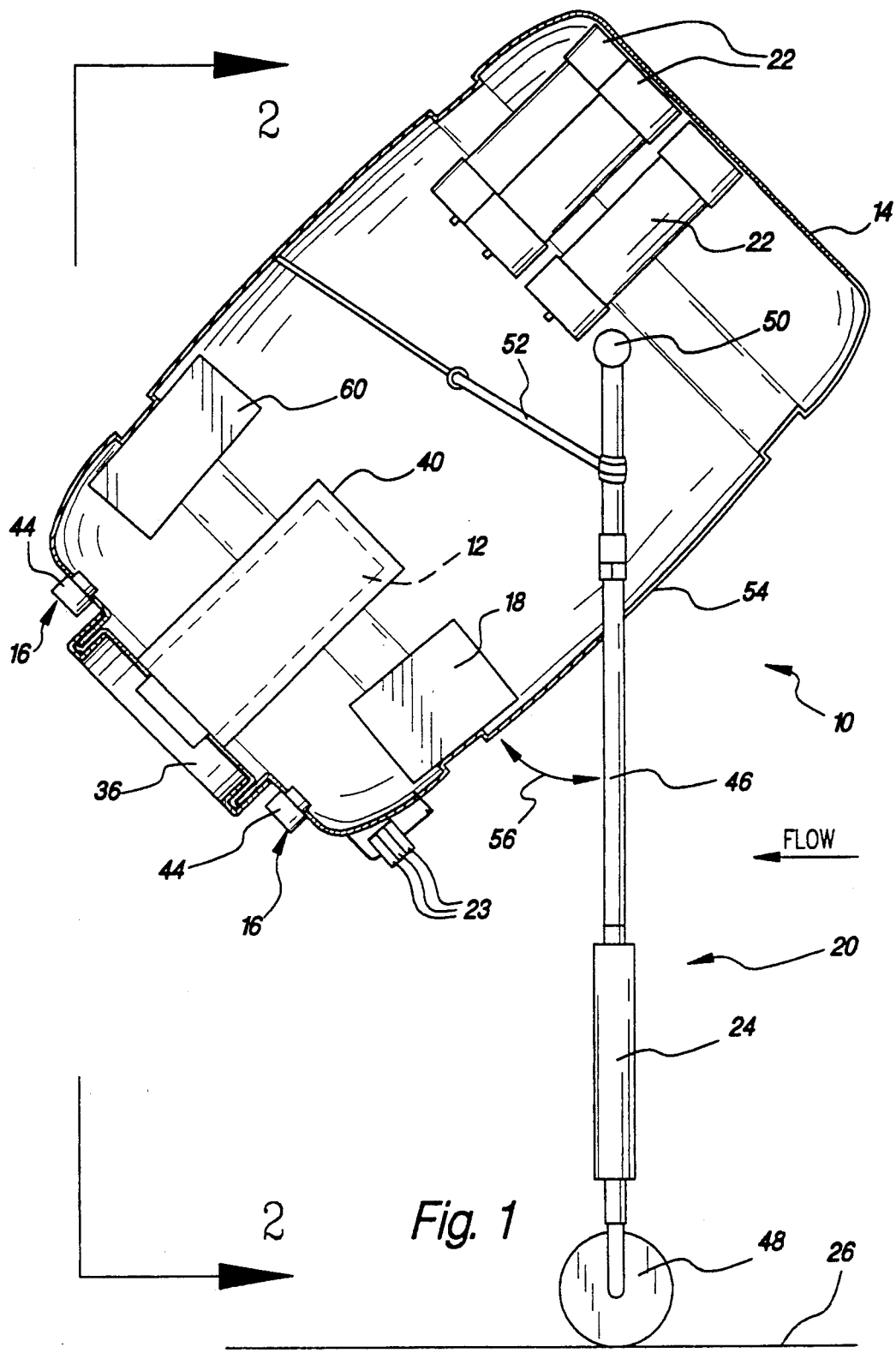
FIG. 1 is a view, partially and cross section and partially in elevation, of a device in accordance with the invention.
Figure 2:
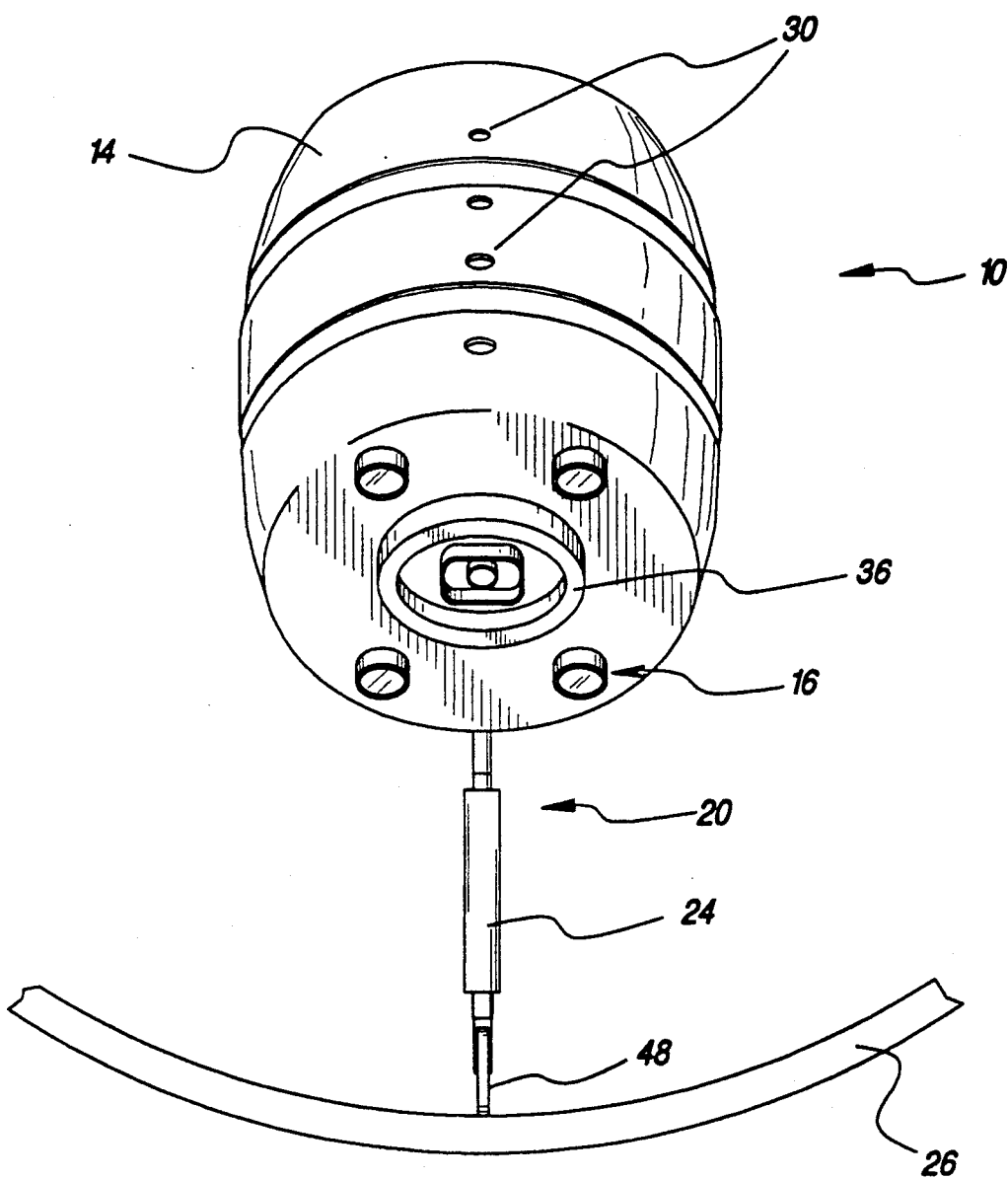
FIG. 2 is a front elevation view as seen approximately from the plane indicated by section 2—2.

Referring to FIG. 1, the device 10 of the present invention includes a camera 12, a vessel 14, lights 16, a battery 18, a support leg 20, a plurality of floats 22, and a ballast weight 24. In use, the device 10 is submersed and placed in the inlet of the pipeline 26 to be viewed. Pumps (not shown) which draw water through the pipeline 26 are activated. The device 10 is conveyed through the pipeline 26 by the flow of the water. Generally, the device 10 maintains a predetermined orientation throughout its journey. An electric control circuit 58 controls the camera 12 and lights 16. The device 10 is subsequently retrieved at a downstream end of the pipeline 26.

Figure 3:
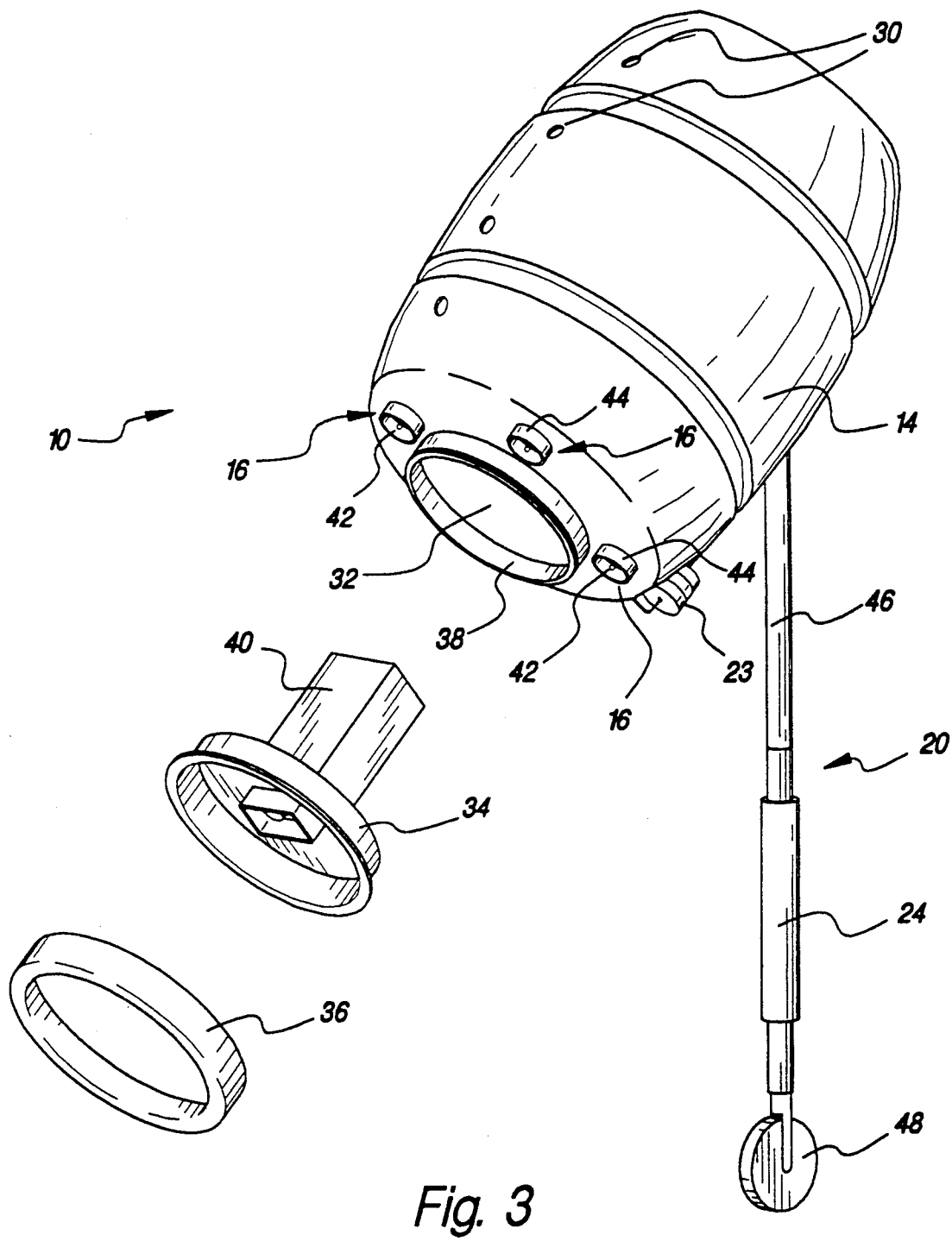
FIG. 3 is a perspective view of the device of FIG. 1.

The vessel 14 of the preferred and illustrated embodiment is a barrel-like structure. The vessel 14 is not water-tight; a plurality of holes 30 permit fluid to enter the vessel 14. The vessel 14 serves to support and contain the various parts of the device 10. The vessel 14 has an opening 32 in one end and includes a lid 34 and a fastening ring 36 for fastening the lid 34 to the opening 32. A rim 38 is formed around the opening 32 having threads in a manner similar to the mouth of a jar. During assembly, the lid 34 is placed between the fastening ring 36 and the rim 38 as seen in FIGS. 1 and 3. The fastening ring 36 is threaded to engage the rim 38 and secure the lid 34 to the vessel 14.

Referring to FIGS. 1 and 3, the camera 12 is secured to the lid 34 with its lens pointing outward and its body located inside the vessel 14. The preferred camera 12 is simply a common video camera using standard video tape cartridges. The camera 12 is enclosed in a commercially available water-tight enclosure 40. In an experimental device, a SONY V-90 (trademark) camera enclosed in an IKELITE (trademark) water-tight enclosure were successfully employed.

The lights 16 are secured to the vessel 14 around the opening 32. The lights 16 are arranged to cast light in the direction the camera 12 is pointing. Each light 16 includes a light bulb 42 mounted to a white plastic reflector 44. The preferred number of lights 16 is four. Too many lights will draw too much power from the battery 18 and too-few lights 16 casts insufficient light. In an experimental device, four GENERAL ELECTRIC (trademark) 55-watt halogen light bulbs were successfully employed.

The support leg 20 extends from the underside of the vessel 14. The leg 20 includes a removable section 46, the ballast weight 24, and a wheel 48. The leg 20 is pivotally connected to a shaft 50 which is fixed to the vessel 14. An elastic band 52 is strung between the leg 20 and the vessel wall. A slot 54 is formed in the underside of the vessel 14 through which the leg 20 extends. The slot 54 extends from approximately midway along the vessel 14 to the end of the vessel as shown in FIG. 1. The leg 20 is pivotable about the shaft 50 in the counterclockwise direction as viewed in FIG. 1 against the tension of the elastic band 52. The leg 20 is normally held in the position shown in FIG. 1 with the leg in engagement with the forward end of the slot 54. If the device 10 encounters an obstruction such as a log in the pipeline 26, the leg 20 is operable to pivot backwards to ride over the obstacle. Once beyond the obstacle, the leg 20 returns to its forward position. The wheel 48 serves to reduce the frictional contact between the pipeline and the leg 20. The leg 20 is somewhat flexible which serves to reduce shock on the camera 12.

The ballast weight 24 stabilizes the vessel 14 and resists rotation of the vessel 14 about its longitudinal axis. The removable section 46 may be exchanged with longer or shorter sections. This enables further flexibility in controlling the position of the camera 12 with respect to the pipeline 26. The battery 18 also serves as ballast in the vessel 14.

The device 10 construction is self-directing when submersed in flowing fluid. The device 10 is carried by the flow of fluid at a speed which is slower than the speed of the flow. Fluid flowing past the vessel 14 tends to keep the vessel 14 aligned end-to-end with the direction of the flow. The vessel 14 acts as a vane and tends to align itself with the flow in the same manner that a wind vane tends to align itself with the direction of the wind. If the vessel 14 should rotate about the axis of the leg 20, the force of the fluid against the walls of the vessel 14 will become imbalanced. Equilibrium is achieved when the vessel 14 is aligned end-to-end with the direction of flow. The vessel 14 tends to stay in equilibrium providing a stable camera support. The leg 20 must be mounted rearward of the center of the vessel 14 for the "wind vane" effect to work properly.

The plurality of floats 22 are mounted to the vessel 14 with conventional fastening means. The floats 22 are gas containers which have a valve stem for adding or removing pressurized gas. The floats are inflated to a pressure which will prevent the floats from being crushed by water pressure at the maximum operating depth.

The buoyancy of the device 10 is "fine tuned" with a plurality of small weights 23 which are removably connected to the vessel 14. Once the device is underwater at the depth of the pipeline to be viewed, a diver will add or remove weights as desired to adjust the buoyancy. The buoyancy is adjusted such that the device lightly touches the pipeline floor with the wheel 48. The combination of the floats 22 and the ballast weight 24 acts to stabilize the device 10 and keep it upright at all times.

The camera 12 may be aimed higher or lower by adjusting the position of the leg 20. For example, the angle 56 of the leg 20 with respect to the vessel 14 may be changed by adjusting the size of the slot 54. By increasing the angle, the camera 12 is aimed higher. The device 10 is preferably stabilized in this position by placing the floats 22 in the forward portion of the vessel 14 and the battery 18 in the rearward portion of the vessel 14.

A control circuit 58 controls the operation of the camera 12 and lights 16. The control circuit 58 includes the battery 18, a timer 60, and a voltage converter 62. The battery 18 supplies the power to operate both the camera 12 and the lights 16. The voltage converter 62 converts the battery voltage to that required by the camera 12. In an experimental model, a 12-volt battery and a voltage converter which converts 12 volts to 6 volts were successfully used.

The timer 60 completes the circuit between the camera 12, lights 16 and the battery 18. The timer 60 operates to delay closing the circuit 58 between the battery 18 and the lights 16 and camera 12 for a predetermined time. The timer 60 is manually set prior to use. All electrical connections, terminals and wires of the circuit 58 are made water-tight with conventional sealants.

The first step in using the device to photograph a pipeline interior is to deposit the device 10 in the pipeline 26. In underwater pipelines which draw water from a lake, for example, a diver must carry the device 10 to the inlet. The pumps which operate to draw water into the pipeline 26 are normally shut off while the device 10 is being deposited for safety reasons. Normally, a protective screen (not shown) must be removed from the inlet prior to depositing the device 10. Once the device 10 is deposited in the pipeline 26, the pumps are turned on. The control circuit 58 operates the lights 16 and the camera 12 to record images of the pipeline interior on video tape. The water drawn by the pumps conveys the device 10 along the pipeline 26 and directs the vessel 14 and the camera 12 to point in the chosen direction, which, in the preferred and illustrated embodiment, is the downstream direction.

The length of pipeline 26 that may be photographed by one device 10 is limited by the length of a video tape and the life of the battery 18 since the device 10 travels at a fixed speed. The timer 60 permits an unlimited length of pipeline 26 to be photographed if several passes are made by the device 10. That is, a first length of pipeline may be photographed on a first tape. The device is then retrieved and a new tape is placed in the camera 12 and the battery 18 is replaced or charged if necessary. The timer 60 is then set to delay operation of the camera and the lights for a time period slightly less than the time period recorded on the first tape. The device 10 is then re-deposited in the pipeline inlet. A second tape is thus made which begins just before the first tape stopped. The process is repeated until the entire pipeline is photographed. Alternatively, several devices 10 may be deposited in the pipeline at once, each being set to photograph a different section of the pipeline.

In some cases, it is not known if obstructions lie in a pipeline which would block the passage of the device 10. The operator of the device may not want to risk losing a video camera 12. In these instances, a dummy device may be sent through the pipeline first. If the dummy device appears at the downstream location, it is safe to begin using the device 10. A dummy device may be prepared by removing the valuable parts such as the camera 12 from the device 10 and substituting weights approximating the weight of the parts removed.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

I claim:

1. A device for transporting a camera through a pipeline containing flowing fluid for making a photographic recording of the pipeline's interior, said device comprising:

a vessel connected to said camera, said vessel being substantially smaller than the interior area of a pipeline to be photographed such that fluid may flow freely past the vessel between the vessel and a wall of said pipeline;

a leg connected to said vessel, said leg having a proximal end connected to an off-center position of said vessel and a distal end adapted to contact said pipeline wall;

lighting means connected to the vessel for illuminating the pipeline interior; and battery means for powering the lighting means and the camera;

wherein the device is adapted to be conveyed in a downstream direction by fluid flowing inside the pipeline and wherein said device includes vane means for rotating said vessel about said leg, said vane means having an equilibrium position with respect to the direction of said fluid flow such that said vessel is oriented and stabilized in a predetermined position.

2. A device according to claim 1 wherein the leg has a wheel at its distal end for contacting the pipeline.

3. A vessel according to claim 1 including buoyancy means and ballast means for stabilizing the vessel.

4. A vessel according to claim 3 wherein the ballast means comprises a weight connected to said leg.

5. A vessel according to claim 3 wherein the buoyancy means comprises a gas-filled container.

6. A device according to claim 1 including a timer for controlling an operation of the camera.

7. A device according to claim 1 including a timer for controlling an operation of the camera and the lighting means.

8. A device according to claim 1 wherein the camera is disposed in a water-tight enclosure.

9. A device for transporting a camera and a lighting means through a pipeline containing flowing fluid for photographing an interior of said pipeline, said device comprising:

a vessel for supporting the camera and the lighting means, said vessel being substantially smaller than the interior area of a pipeline to be photographed such that fluid may flow freely past said vessel between said vessel and a wall of said pipeline while said device is being transported;

a float means for applying a buoyant force on the vessel;

a ballast means for stabilizing the vessel;

battery means for powering the camera and the lighting means; and a leg connected to the vessel at an off-center location, said leg being operable to contact the pipeline wall, wherein the leg and the vessel form a directional vane which tends to self-align the vessel with the direction of flow of the fluid.

10. A method of photographing the interior of fluid-filled pipelines comprising the steps of:

(a) providing a camera connected to a vessel, said vessel having a leg connected to an off-center position on the vessel, a distal end of said leg being adapted to contact a wall of said pipeline;

(b) depositing said vessel into an entrance of the pipeline;

(c) operating a pump to draw fluid through the pipeline and between said vessel and a wall of said pipeline such that the device is transported through the pipeline by the moving fluid at a speed which is slower than the speed of the fluid;

(d) orienting and stabilizing said vessel with a vane means adapted to rotate said vessel about said leg until an equilibrium orientation is reached;

(e) operating the camera while the vessel is transported through the pipeline;

(f) lighting an area adjacent the vessel with a lighting means connected to the vessel.

11. A method according to claim 10 including the step of delaying an operation of the camera and the lighting means with a control circuit for a predetermined period.

12. A method according to claim 10 including the step of recording images produced by the camera on a recording medium disposed on board the vessel.

13. A method according to claim 10 including the step of adjusting the buoyancy of the vessel prior to performing step (a).

14. A method according to claim 10 including the steps of:

depositing a dummy vessel into an entrance of the pipeline, the dummy vessel having substantially similar buoyancy characteristics to the self-orienting vessel;

operating the pump to transport the dummy vessel through the pipeline; and verifying the arrival of the dummy vessel at a predetermined downstream location prior to performing step (a).

* * * * *